May 22, 1928.
J. W. MONTGOMERY
PAN LIFTER
Filed April 4, 1927
1,670,732
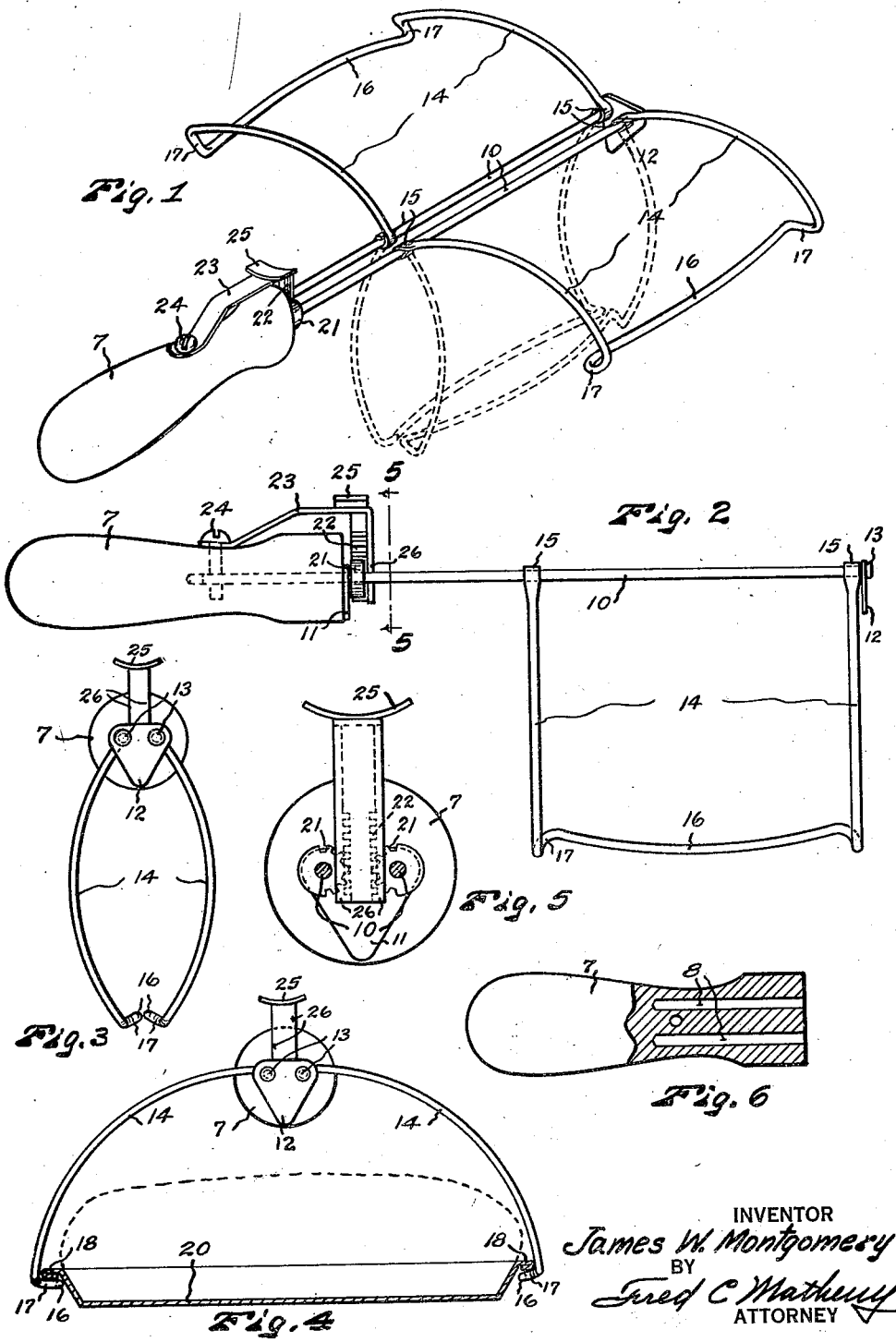
INVENTOR
James W. Montgomery
BY
Fred C. Matheny
ATTORNEY Patented May 22, 1928.

1,670,732

UNITED STATES PATENT OFFICE.

JAMES W. MONTGOMERY, OF SEATTLE, WASHINGTON.

PAN LIFTER.

Application filed April 4, 1927. Serial No. 180,668.

My invention relates to improvements in pan lifters and the general object of my invention is to provide a pan lifter of simple and efficient construction that may be conveniently used for picking up pans or dishes or cooking utensils that are hot or that can not be conveniently handled with the hands.

A further object of my invention is to simplify and cheapen the construction of pan lifters of this nature and to render the same more easily assembled and more efficient in operation.

More specific objects, which form the subject matter of the appended claims, are to provide a pan lifter of this nature embodying two parallel rods spaced a short distance apart, connected at their outer ends by clip or link means and having their inner ends rotatably mounted in the end of a handle, said rods having gear segments secured thereto adjacent the end of the handle that are disposed to mesh with gear rack means for rotating the rods, the gear rack means having flanges that overhang the gear segments for holding the rods in assembled relation and the gear rack being connected with a spring that normally urges the rods in one direction and that may be depressed by the thumb for rotating the rods in the opposite direction, the rods being provided with pan grasping arms that are opened and closed by the rotation of the rods. By this arrangement I am able to provide a simple and efficient pan lifter whose process of assembly is very simple, and necessitates only applying the outer end clip, inserting the rods in the handle and securing the combined spring and gear rack to the handle by a single screw.

A further object is to provide a pan lifter of this nature in which the pan grasping arms are curved so as to be clear of the contents of a pan in case said contents extend above the top of the pan.

Other and more specific objects will be apparent from the following description taken in connection with the accompanying drawings.

In the drawings Fig. 1, is a perspective view of a pan lifter constructed in accordance with my invention showing, by full lines, the pan grasping arms open, and by dotted lines, the pan grasping arms closed.

Fig. 2, is a side elevation of the same showing the pan grasping arms closed.

Fig. 3, is an elevation of the outer end of the same showing the arms closed.

Fig. 4, is an end elevation, taken from the outer end, showing the arms in engagement with a pan as they may appear when picking the pan up.

Fig. 5, is a sectional view on a larger scale on broken line 5—5 of Fig. 2, illustrating the gear segments and gear rack and the overlapping flange that holds the rods assembled in the handle.

Fig. 6, is a fragmentary detached view partly in section and partly in plan of the handle.

Referring to the drawings, throughout which like reference numerals designate like parts, 7 designates a handle of convenient shape and size to be grasped in the hand. The handle 7 is provided with two parallel spaced apart bores 8 extending from one end inwardly for rotatably receiving and supporting the inner ends of two rods 10 that extend outwardly in prolongation of said handle in parallel, spaced apart, relation. The rods 10, extend through two spaced apart, holes in a triangularly shaped metal clip 11 that rests against the end of the handle, the clip 11 serving as a bearing for the rods and helping to prevent the enlargement, by wear, of the holes 8 in the handle when the handle is made of soft material, as wood. Another triangular clip 12 of duplicate construction is provided on the outer ends of the rods 10 to support said outer ends for rotation in spaced apart parallel relation. The extreme outer ends of the rods may be enlarged slightly, as by soldering or upsetting, as at 13 to prevent displacement of the clip 12. The clip 12 serves as a hook and pusher by which hot pans, dishes, and the like may be moved.

Two approximately U shaped pan grasping arms 14, of duplicate construction, are rigidly secured to the respective rods 10 as by bending the ends of said pan grasping arms around the rods as indicated at 15 and soldering or welding said ends to said rods. The outermost portions 16 of the pan grasping arms are bent inwardly as at 17 at the points where they connect with the ends of said pan grasping arms to form hook like portions for engaging beneath the flange 18 of a pan or dish 20 that is to be lifted. The end members of said pan grasping arms are curved as more clearly shown in Fig. 4, so that they may be used to pick up a receptacle where the contents project above the top of said receptacle as indicated by dotted lines in Fig. 4, without coming in contact with the top of said contents. By rotating the rods 10 in the proper directions the pan grasping arms may be swung apart as shown by full lines in Fig. 1, and placed over a pan and then allowed to close so that the portions 16 engage beneath the flanges of the pan.

Two small gear segments 21 are rigidly secured to the respective rods 10 near the end of the handle 7 and are adapted to mesh with a rack bar 22 that extends therebetween, see Fig. 5. The rack bar 22 is secured to a flat spring member 23 which has one end fastened to the handle 7 by a screw 24 and which is inclined away from said handle and is provided with a thumb piece 25 by which it may be depressed to move the rack bar 22 vertically and rotate the rods 10 in opposite directions. The spring 23 extends downwardly over the front side of the rack bar and is wider than the rack bar so that it forms flanges 26 that project beyond the toothed edges of the rack bar and overhang the outer sides of the gear segments 21 and prevent removal of the rods 10 from the handle. This flange structure greatly simplifies the assembly of the device and makes it possible to secure the rods 10 within the handle by the one screw 24 that secures the spring 23 to said handle.

In the use of this pan lifter the user grasps the handle 7 and opens the pan grasping arms 14 by pressing downwardly with the thumb on the thumb piece 25. With the arms 14 thus open the device is placed above the pan that is to be lifted and the arms are allowed to close, by reason of the force of the spring 23, onto the pan, the portions 16 will engage beneath the flanges 18 of the pan and will securely grip the pan and permit it to be lifted without danger of tipping or dropping. The spring 23 closes the arms 14 onto the pan and the weight of the pan and its contents tends to cause said arms to hold more tightly. The pan lifter may be used on any receptacle or utensil of substantially any shape that is provided with flanges, or equivalent means, under which the arm portions 16 may engage. The device is especially useful for reaching into hot ovens or similar places for picking up hot cooking utensils that could not otherwise be picked up without danger of burning the hands. The clip 12 serves as a means by which a utensil may be conveniently pushed or pulled around on a hot stove or in a hot oven. The spring 23 will always close the arms 14 into the position shown by dotted lines in Fig. 1 when the device is not in use, making the device comparatively compact for hanging up or putting away.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a pan lifter, a handle, two rotatably mounted spaced apart, parallel, rods extending outwardly from the end of the handle, a clip connecting the outer ends of said rods, pan grasping members secured to said rods and means for turning said rods to open and close said pan grasping members.

2. In a pan lifter, a handle, two rotatably mounted, spaced apart, parallel rods extending outwardly from the end of the handle, clip means connecting the outer ends of the rods, two substantially U shaped pan grasping members each having its two extremities rigidly secured to one of the rods and its outer side bent to form a hook portion adapted to engage beneath the flanged edge of a pan, and means for turning said rods to swing said pan grasping members into open or closed position.

3. The pan lifter as described in claim 4 in which the end portions of the U shaped pan grasping members are curved to clear the contents of a pan that may extend above the top of the pan.

4. In a pan lifter, a handle, two parallel, spaced apart rods rotatably mounted in the end of said handle and extending outwardly therefrom, pan grasping arms secured to said rods, gear segments secured on said rods, and a thumb actuated rack bar meshing with said gear segments for rotating said rods and opening and closing said pan grasping arms.

5. In a pan lifter, a handle, two parallel, spaced apart rods rotatably mounted in the end of said handle and extending outwardly therefrom, pan grasping arms secured to said rods, gear segments secured on said rods, a rack bar extending between said gear segments and meshing with the same for turning the rods and a spring urging said rack bar in one direction for swinging the pan grasping arms together, said rack bar being adapted to be moved in the opposite direction by manual pressure to swing said pan grasping arms apart.

6. In a pan lifter, a handle, two parallel, spaced apart rods rotatably mounted in the end of said handle and extending outwardly therefrom, pan grasping arms secured to said rods, gear segments secured on said rods, a rack bar extending crosswise of the end of said handle between said gear segments and meshing with said gear segments, flange members overhanging the toothed edges of said rack bar and engaging said gear segments to secure the rods in assembled relation within the handle and a flat spring connected with the upper end of said rack bar and secured to said handle and movable by manual pressure for moving said rack bar to rotate said rods.

7. In a pan lifter of the class described a handle having two parallel bores extending from one end inwardly, two rods rotatable in said bores, pan grasping arms external to the bores and rigid with the rods, a gear segment rigid with each rod adjacent the end of the handle, an angularly shaped spring of flat metal secured to the handle and diverging therefrom and having an end portion extending crosswise of the end of the handle between the rods, said end portion overlapping the gear segments to hold the rods in assembled relation within said bores and a gear rack secured to the inner side of the rod retaining end portion of said spring and meshing with said gear segments, the force of said spring tending to rotate each rod in one direction and manual pressure on said spring tending to rotate each rod in the opposite direction.

The foregoing specification signed at Seattle, Wash., this 28th day of March, 1927

JAMES W. MONTGOMERY.